US012014269B2

(12) United States Patent
Willcock (10) Patent No.: US 12,014,269 B2
(45) Date of Patent: Jun. 18, 2024

(54) GRADIENT DESCENT ALGORITHM FOR NEAR-ZERO LEARNING RATE

(71) Applicant: Google LLC, Mountain View, CA (US)

(72) Inventor: Jeremiah Willcock, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 904 days.

(21) Appl. No.: 17/069,227

(22) Filed: Oct. 13, 2020

(65) Prior Publication Data

US 2022/0083854 A1    Mar. 17, 2022

Related U.S. Application Data

(60) Provisional application No. 63/077,868, filed on Sep. 14, 2020.

(51) Int. Cl.
| | | |
|---|---|---|
| *G06N 3/08* | (2023.01) | |
| *G06N 3/084* | (2023.01) | |
| *G06N 3/0895* | (2023.01) | |
| *G06N 3/09* | (2023.01) | |

(52) U.S. Cl.
CPC ............... *G06N 3/08* (2013.01); *G06N 3/084* (2013.01); *G06N 3/0895* (2023.01); *G06N 3/09* (2023.01)

(58) Field of Classification Search
CPC ............ G06N 3/08; G06N 3/084; G06N 3/09; G06N 3/0895
See application file for complete search history.

(56) References Cited

U.S. PATENT DOCUMENTS

| | | | |
|---|---|---|---|
| 2019/0188568 A1 | 6/2019 | Keskar et al. | |
| 2020/0134461 A1* | 4/2020 | Chai | G06N 3/084 |
| 2021/0110213 A1* | 4/2021 | Li | G06F 18/24 |

FOREIGN PATENT DOCUMENTS

WO    2019210431 A1    11/2019

OTHER PUBLICATIONS

Lili Jiang, "A Visual Explanation of Gradient Descent Methods (Momentum, AdaGrad, RMSProp, Adam)", Jun. 7, 2020, Towards Data Science, https://towardsdatascience.com/a-visual-explanation-of-gradient-descent-methods-momentum-adagrad-rmsprop-adam-f898b102325c (Year: 2020).*
Sebastian Bock, et al., "A Proof of Local Convergence for the Adam Optimizer", Sep. 30, 2019, https://ieeexplore.ieee.org/document/8852239 (Year: 2019).*

(Continued)

*Primary Examiner* — Vincent Gonzales
(74) *Attorney, Agent, or Firm* — Lerner David LLP (57) ABSTRACT

A system and method for iteratively updating a parameter according to a gradient descent algorithm. In a given $n^{th}$ iteration of the method, one or more processors may determine a gradient value of a gradient vector of the parameter in a first dimension, determine a product value based at least in part on a sum of (i) the product value determined in an $n-1^{th}$ iteration and (ii) a product of the determined gradient value and a learning rate of the gradient descent algorithm, determine an updated parameter value according to a function including the product value, and update the parameter to equal the updated parameter value.

22 Claims, 5 Drawing Sheets

(56) References Cited

OTHER PUBLICATIONS

Alexandre Defossez, et al., "A Simple Convergance Proof of Adam and Adagrad", Mar. 5, 2020, Arxiv (Year: 2020).*
Zeiler, Matthew D. "Adadelta: an adaptive learning rate method." arXiv preprint arXiv: 1212.5701 (2012). (Year: 2012).*
Swanston et al. Simple Adaptive Momentum: New Algorithm for Training Multilayer Perceptrons. Sep. 1, 1994. Electronics Letters, IEE Stevenage, GB, vol. 30, No. 18, pp. 1498-1500, DOI: I0.1049/EL:I9941014.
International Search Report and Written Opinion for International Application No. PCT/US2021/049995 dated Jan. 14, 2022. 15 pages.
McMahan, H. B. et al. Ad Click Prediction: a View from the Trenches. KDD'13, Aug. 11-14, 2013, Chicago, Illinois, USA. 9 pages.

* cited by examiner

GRADIENT DESCENT ALGORITHM FOR NEAR-ZERO LEARNING RATE

CROSS-REFERENCE TO RELATED APPLICATION

The present application claims the benefit of the filing date of U.S. Provisional Patent Application No. 63/077,868 filed Sep. 14, 2020, the disclosure of which is hereby incorporated herein by reference.

BACKGROUND

Gradient descent algorithms are used to update parameters of machine learning algorithms, whereby the parameters are improved over the course of several iterations to converge towards a value that improves an accuracy of the machine learning algorithm. In each iteration, the parameters may be adjusted by a certain amount depending on a cost function indicating a degree of inaccuracy of the parameter. The adjustment may further be scaled according to learning rate, whereby small learning rates cause small adjustments and high learning rates cause larger adjustments.

Typically, learning rates are started at smaller or even zero values in order to avoid initial large adjustments to parameters before a path towards an optimal solution can be discovered. However, some gradient descent algorithms are not capable of supporting a smaller or zero learning rate value, as inputting such a value into the algorithm would cause an error.

BRIEF SUMMARY

The technology relates generally to a method and system for iteratively updating a parameter in a machine learning algorithm according to a gradient descent algorithm that supports zero and near-zero learning rate values. The gradient descent algorithm uses a product value, which is at least in part a product between an accumulated linear gradient value and the learning rate, to iteratively update the parameters. Using the product value, as opposed to using an accumulated linear gradient value, avoids the learning rate appearing in the denominator of the function for determining the updated parameter, which in turn avoids divide-by-zero and similar errors for zero and near-zero learning rate values.

One aspect of the present disclosure is directed to a method for iteratively updating a parameter according to a gradient descent algorithm. The method may include, in an $n^{th}$ iteration of the gradient descent algorithm, determining, by one or more processors, a gradient value of a gradient vector of the parameter in a first dimension, determining, by the one or more processors, a product value based at least in part on a sum of (i) the product value determined in an $n-1^{th}$ iteration and (ii) a product of the determined gradient value and a learning rate of the gradient descent algorithm; determining, by the one or more processors, an updated parameter value according to a function including the product value, and updating, by the one or more processors, the parameter to equal the updated parameter value.

In some examples, the product value may be based at least in part on (i) a product of an accumulated linear gradient value and the learning rate and (ii) the parameter value determined in the $n-1^{th}$ iteration.

In some examples, the product value may equal a difference between (i) the product of the accumulated linear gradient value and the learning rate and (ii) the parameter value determined in the $n-1^{th}$ iteration scaled according to a scaling value.

In some examples, the method may include determining, by the one or more processors, the accumulated square gradient value based on a square of the gradient value and the accumulated square gradient value of the $n-1^{th}$ iteration. The scaling value may be based on each of the accumulated square gradient value and the accumulated square gradient value of the $n-1^{th}$ iteration.

In some examples, the scaling value may be equal to:

$$n_i^{-lr\_power} - n_{i-1}^{-lr\_power}$$

wherein $n_i$ is the accumulated square gradient value, $n_{i-1}$ is the accumulated square gradient value of the $n-1^{th}$ iteration, and lr_power is a predetermined parameter.

In some examples, the function including the product value may determine the parameter value to equal zero in response to a ratio between an absolute value of the product value and the learning rate exceeding a predetermined fixed value, and a non-zero value in response to the ratio between the absolute value of the product value and the learning rate being less than or equal to the predetermined fixed value.

In some examples, the method may include determining the non-zero value according to a parameter function. A denominator of the parameter function may include each of the accumulated square gradient value, a first predetermined fixed value, and a second predetermined fixed value, whereby the parameter function returns a divide-by-zero error only when each of the accumulated square gradient value, the first predetermined fixed value, and the second predetermined fixed value equals zero.

In some examples, the parameter function may be:

$$\frac{\lambda_1 \eta(sgn(p_i)) - p_i}{n_i^{-lr\_power} + \beta + 2\lambda_2 \eta}$$

wherein $\lambda_2$ and $\beta$ are the first and second predetermined fixed values, $\lambda_1$ is a third predetermined fixed value, $\eta$ is the learning rate, $p_i$ is the product value, and $n_i$ is the accumulated square gradient value.

In some examples, the learning rate may be predefined to begin at zero and increase over time.

In some examples, the learning rate may be predefined to begin close to zero and increase over time.

In some examples, the gradient vector of the parameter may be include a plurality of dimensions. The method may be performed independently for each respective dimension of the gradient vector.

In some examples, the parameter may be a parameter of a neural network.

In some examples, the gradient descent algorithm may be any one of a stochastic gradient descent algorithm, a Follow the Regularized Leader (FTRL) learning algorithm, Adagrad, Adam, or RMSProp.

In some examples, the learning rate may be predefined to change over time, and a number of cores included in the one or more processors assigned to perform the method may remain constant as the learning rate changes over time.

Another aspect of the disclosure is directed to a system including memory for storing instructions; and one or more processors coupled to the memory and configured to execute the stored instructions to iteratively update a parameter according to a gradient descent algorithm and to perform any of the methods disclosed herein. In some examples, the one or more processors may include a constant number of cores assigned to iteratively update the parameter according to the gradient descent algorithm.

DETAILED DESCRIPTION

Figure 1:
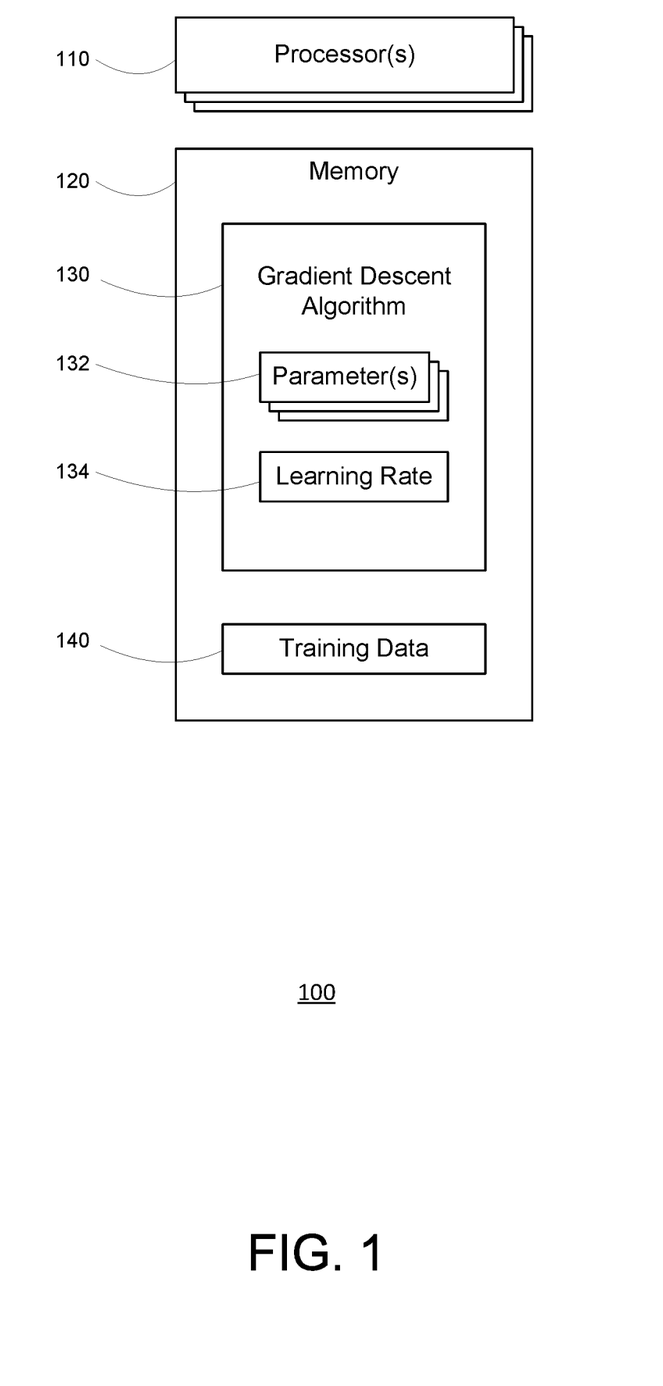
FIG. 1 is a block diagram illustrating an example system in accordance with an aspect of the present disclosure.

FIG. 1 is a block diagram illustrating an example system 100 including a computing environment for processing queries. The system 100 may include one or more processors 110 and memory 120 in communication with the one or more processors. The processors 110 may include well-known processors or other lesser-known types of processors. Alternatively, the processors 110 can be dedicated controllers such as an ASIC, a graphics processing unit (GPU) or a tensor processing unit (TPU). The memory 120 may include a type of non-transitory computer readable medium capable of storing information accessible by the processors 110, such as a hard-drive, solid state drive, tape drive, optical storage, memory card, ROM, RAM, DVD, CD-ROM, write-capable, and read-only memories. The system 100 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. The datacenter may include a number of other devices in addition to the storage devices, such as cabling, routers, etc.

The memory 120 can store information accessible by the one or more processors 110, including data that is received at or generated by the processors 110, and instructions that can be executed by the one or more processors 110. The data can be retrieved, stored or modified by the processors 110 in accordance with the instructions. For instance, although the system and method is not limited by a particular data structure, the data can be stored in computer registers, in a data store as a structure having a plurality of different fields and records, or documents, or buffers. The data can also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data. The instructions may include various algorithms for instructing the processor 110 to execute operations. Instructions may include a set of instructions executed directly, such as machine code stored in object code format for direct processing by the processor 110, or indirectly, such as scripts, scripts or collections of independent source code modules that are interpreted on demand or compiled in advance. In this regard, the terms "instructions," "steps," "routines," and "programs" can be used interchangeably herein.

The instructions may include a gradient descent algorithm 130 programmed to instruct the one or more processors 110 to receive training data 140, to process the training data 140 according to one or more specified goals of the gradient descent algorithm 130, and to incrementally adjust the gradient descent algorithm 130 based on success or failure of the processing results in order to better achieve the specified goals in future processing of new data. The gradient descent algorithm 130 may be used in a supervised learning algorithm, whereby success or failure of the processing results may be determined according to known properties of the training data 140. Alternatively, the gradient descent algorithm 130 may be used in a completely or partially unsupervised learning algorithm, whereby success of failure of the processing results may be derived at least in part from the processing results themselves, such as through clustering or association algorithms. In the case of completely or partially unsupervised learning algorithm, at least some training data 140 may have unknown properties, like the new data processed in the future by the gradient descent algorithm.

The gradient descent algorithm 130 may operate on one or more parameters 132 of a machine learning structure of the system. The machine learning structure may be a machine learning algorithm or other algorithm, and for which an output of the structure is a function of an input and one or more variables or parameters. The machine learning structure may be altered to improve an accuracy of the output by adjusting the parameters 132. By way of example, in a neural network, the parameters may include weights or embeddings between nodes and layers of the network, dense layers, or any combination thereof. The machine learning structure may also operate according to one or more hyperparameters, such as a number of layers, or a learning rate 134. The learning rate 134 may dictate a size of the adjustments to the machine learning structure for a given iteration of the gradient descent algorithm. It should be recognized that different machine learning structures may include different parameters and hyperparameters.

In some examples, the gradient descent algorithm 130 may operate on one or more hyperparameters of the machine learning structure. By way of example, the learning rate 134 may be adjusted according to an output of the gradient descent algorithm 130. For instance, if the gradient descent algorithm 130 causes a large change to the parameter 132, then it may be determined to increase the learning rate 134 in order to slow down a rate of change of the parameter 132 per iteration of the gradient descent algorithm 130. Conversely, if the gradient descent algorithm 130 causes a small change to the parameter 132, then it may be determined to maintain or decrease the learning rate 134. Alternatively, hyperparameters such as learning rate may be predetermined. For instance, the learning rate 134 may change according to a predetermined function, such as a step function, over time, or may remain constant. In the case of the learning rate being a step function, the learning rate may begin at zero or close to zero and increase over time. Values "close to zero" include values for which a function that determines an updated parameter using the gradient descent algorithm 130 divides by the learning rate return an error or an inaccurate result.

Although FIG. 1 functionally illustrates each of the processor 110 and memory 120 as being a single block, the processor 110 and memory 120 may actually include multiple processors and memories that may or may not be stored within the same physical housing. For example, some of the data and instructions stored in the memory can be stored on a removable CD-ROM and others within a read-only computer chip. Some or all of the instructions and data can be stored in a location physically remote from, yet still accessible by, the processors 110.

Figure 2:
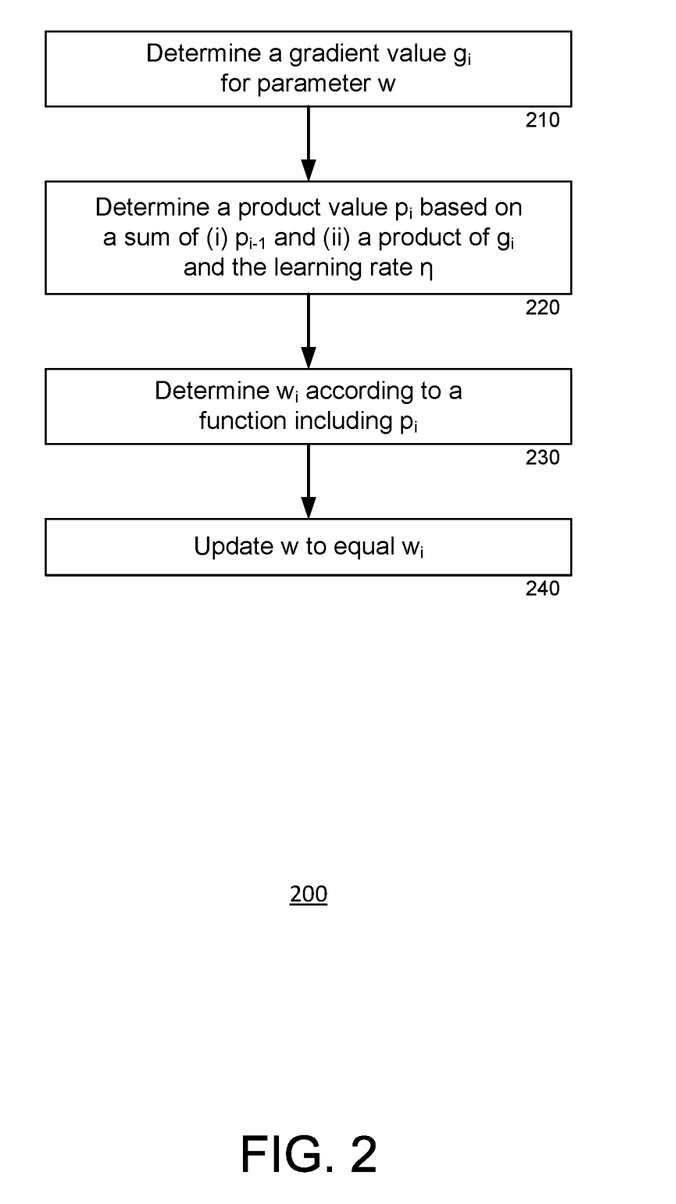
FIG. 2 is a flow diagram illustrating an example routine in accordance with an aspect of the present disclosure.

FIG. 2 is a flow diagram illustrating an example routine 200 for updating a parameter "w" of a gradient descent algorithm. The example routine 200 illustrates steps of a single iteration "i" of the gradient descent algorithm, whereby a previous iteration of the gradient descent algorithm is defined as "i−1." The parameter determined in the i−1$^{th}$ iteration is referred to herein as $w_{i-1}$, and the parameter being determined in the i$^{th}$ iteration is referred to as $w_i$. The routine may be executed by one or more processors, such as processor 110 shown in FIG. 1.

At block 210, the one or more processors determine a gradient value $g_i$ of the parameter w. The gradient value $g_i$ may be calculated according to a cost function that characterizes a degree of success or failure of the processing results with regard to the most recently determined parameter value $w_{i-1}$, for example by comparing the actual parameter output by the gradient descent algorithm against a predicted output for the parameter.

The gradient value $g_i$ of the i$^{th}$ iteration of the gradient descent algorithm can be used to calculate one or both of an accumulated linear gradient value $m_i$ and an accumulated square gradient value $n_i$. The accumulated linear gradient value $m_i$ may be derived by summing the gradients calculated at each iteration of the gradient descent algorithm. Similarly, the accumulated square gradient value $n_i$ may be derived by summing the squares of the gradients calculated at each iteration of the gradient descent algorithm.

At block 220, the one or more processors determine a product value $p_i$. The product value $p_i$ may be based on a sum of the product value in the previous iteration of the algorithm $p_{i-1}$ and a product of $g_i$ with the learning rate η of the gradient descent algorithm. For example, the product value $p_i$ may equal a product of the accumulated linear gradient value and the learning rate. For further example, $p_i$ may be derived by further subtracting a scaled $p_{i-1}$. The scaling value used for scaling $p_{i-1}$ may be based on the accumulated square gradient value $n_i$. The scaling value may be based on the accumulated square gradient value of the previous iteration $n_{i-1}$.

Figure 3:
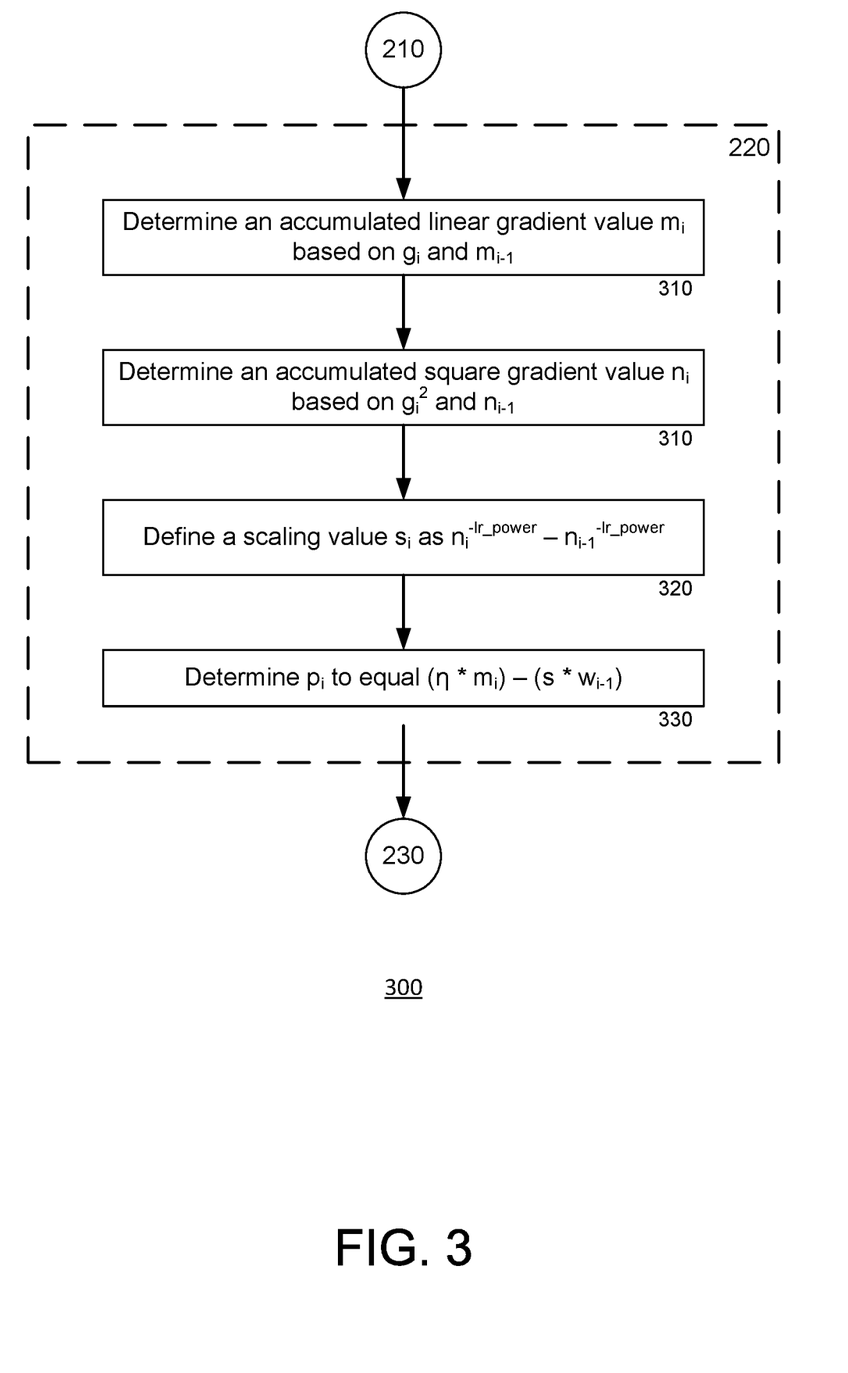
FIGS. 3 and 4 are flow diagrams illustrating example subroutines of the routine of FIG. 2.

An example calculation of $p_i$ is shown in subroutine 300 of FIG. 3. At block 310, the accumulated square gradient value $n_i$ is determined. The value $n_i$ may be the sum of and $n_{i-1}$ and $g_i^2$. At block 320, a scaling value $s_i$ is calculated according to the following scaling value function:

$$n_i^{-lr\_power} - n_{i-1}^{-lr\_power} \quad (1)$$

where "lr_power" is a predetermined parameter. At block 330, $p_i$ is determined to equal the following product value function:

$$(\eta * m_i) - (s * w_{i-1}). \quad (2)$$

Returning to FIG. 2, at block 230, an updated parameter value $w_i$ is determined according to a function that includes the product value $p_i$.

Figure 4:
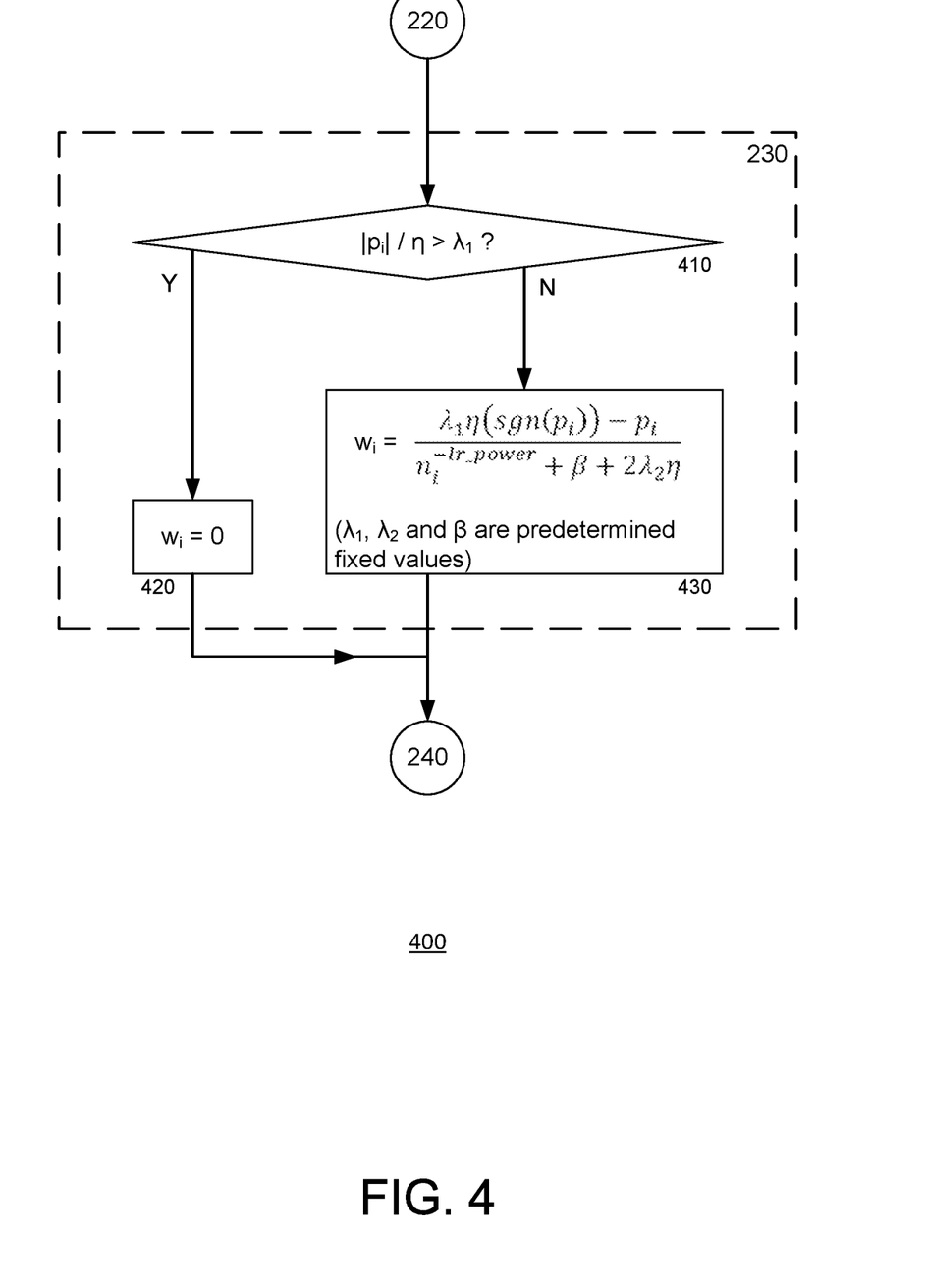

An example calculation of $w_i$ is shown in subroutine 400 of FIG. 4. At block 410, it is determined whether a ratio between an absolute value of the product value |$p_i$| and the learning rate f exceeds a predetermined fixed value $λ_1$. This determination evaluates whether the accumulated linear gradient value $m_i$ is large or small while also taking into account more recent changes to the accumulated square gradient value $n_i$ since the previous iteration, whereby the predetermined fixed value $λ_1$ functions as a threshold. If the ratio is larger than the threshold value, then operations may be continue at block 420, in which the updated parameter value is determined to equal zero. Otherwise, if the ratio is less than or equal to the threshold value, then operations may be continue at block 430, in which the updated parameter value is determined according to the following parameter value function:

$$\frac{\lambda_1 \eta(sgn(p_i)) - p_i}{n_i^{-lr\_power} + \beta + 2\lambda_2 \eta} \quad (3)$$

where $λ_2$ and β are both predetermined fixed values, and "sgn" is the sign function. The denominator of the parameter value function (3) includes each of the accumulated square gradient value $n_i$ and two separate predetermined fixed values $λ_2$ and β. Furthermore, the parameter value function would return a divide-by-zero error only when each of the accumulated square gradient value $n_i$ and both predetermined fixed values $λ_2$ and β equal zero. $n_i$ is typically set to an initial non-zero value, and furthermore, it would not be a valid configuration for all of $n_i$, $λ_2$ and β to equal zero. Therefore, the parameter value function (3) avoids resulting in a divide-by-zero error.

Returning again to FIG. 2, at block 240, the parameter w of the machine learning structure is updated to equal the determined parameter value $w_i$ of the $i_{th}$ iteration. Updating the parameter w may cause the machine learning structure to output a different result for a given input, whereby a cost function of the machine learning structure is iteratively reduced or optimized over the course of several iterations of the gradient descent algorithm. As such, the machine learning structure may converge towards an optimal or relatively optimal set of parameters that minimizes or relatively decreases the cost function, resulting in more accurate determinations by the machine learning structure for future data inputs.

The above example routines demonstrate a single iteration of a machine learning process, whereby a single parameter w of a machine learning structure is moved incrementally closer to an optimal solution. It should be understood that the routine may be performed iteratively, whereby, with each iteration, the parameter continues to move closer to the optimal solution based on the training data fed to the system between iterations. An amount of time between the iterations is dictated by the learning rate, which may be fixed or change over time, either according to a predetermined schedule or as a function of the machine learning process. Additionally, it should be understood that the system may include several parameters, and that the routine may be performed for each of the parameters independently, whereby each parameter is representative of a different dimension of a gradient vector. With each iteration, the set of parameters may move closer to the optimal solution based on the training data provided to the machine learning structure of the system between iterations.

An advantage of the example routine 200 of FIG. 2 is that it avoids divide-by-zero errors for zero or near-zero learning rate values. This is because the denominator of the parameter value function is not multiplied by the learning rate.

The benefit of avoiding divide-by-zero errors for zero or near-zero learning rate values can be seen when an alternative parameter value function that is inversely proportional to learning rate is considered. The alternative function would return divide-by-zero errors for learning rates at or near-zero. In order to avoid the effects of a near zero learning rate in such a parameter value function, it would be necessary for the learning rate to begin at a value that is greater than a near-zero value. However, beginning a machine learning process with a relatively large learning rate can result in the machine learning algorithm failing to converge on a good solution, that is converging towards a set of parameter values that minimizes the cost function. Thus, an alternative way to diminish adjustments to the machine learning structure's parameters is needed to ensure that the gradient descent algorithm converges towards a good solution. One such way is to slow down processing of training data so that less data is considered between each iteration of the gradient descent algorithm. This may be accomplished by limiting the number of processor cores assigned to process the training data using the machine learning structure. Reducing processing would ensure smaller adjustments to the parameters at each iteration. Eventually the processing speed may be sped up after the gradient descent algorithm starts moving towards a good solution, but this would not happen until after several iterations of the gradient descent algorithm.

Figure 5:
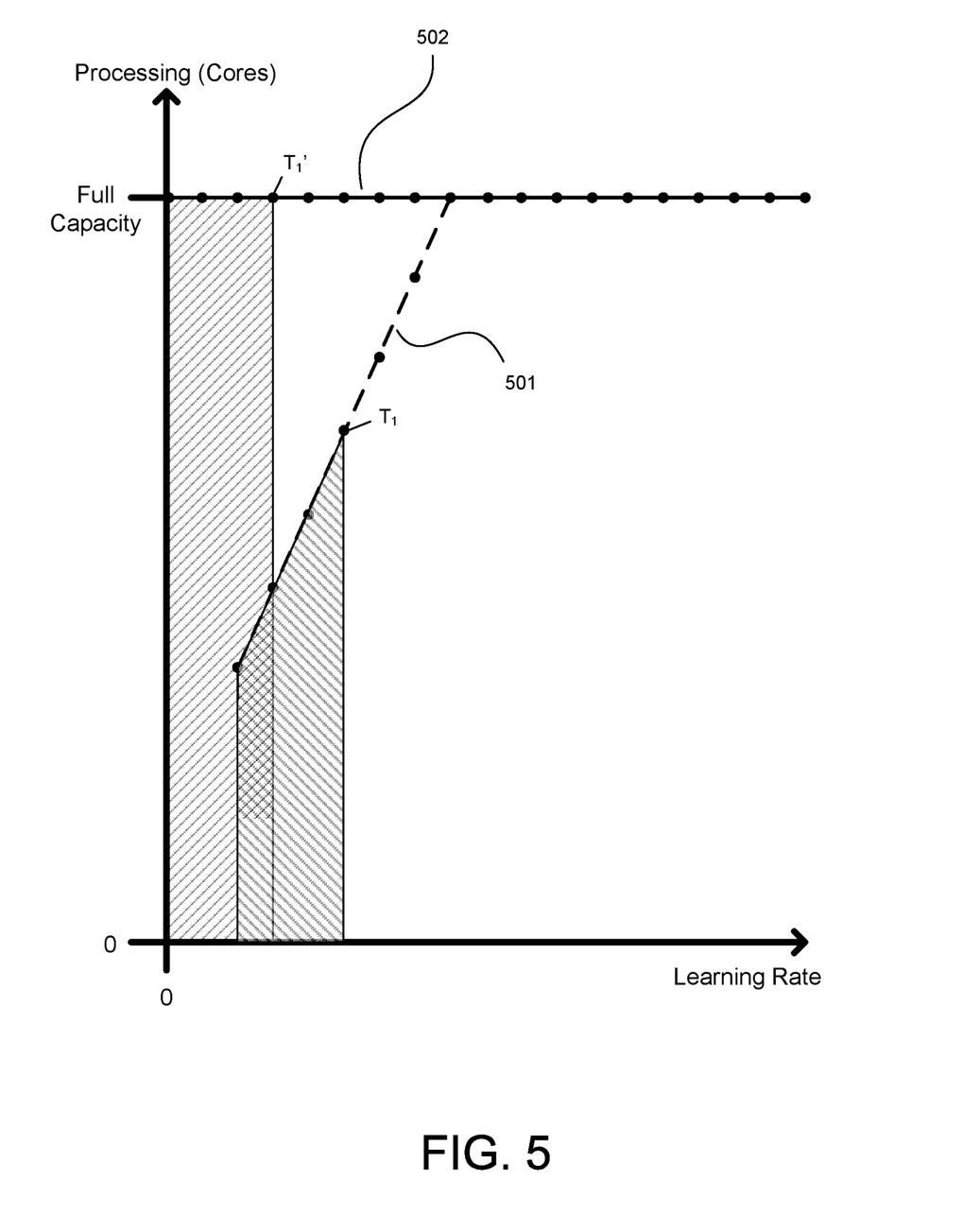
FIG. 5 is a flow diagram illustrating a relationship between processing and learning rate for a gradient descent algorithm in accordance with an aspect of the present disclosure.

FIG. 5 illustrates a difference between training data processing speed for the gradient descent algorithm of the present application as compared to a hypothetical alternative gradient descent algorithm (hereinafter referred to as "Alt_GD") that is subject to divide-by-zero errors for zero or near-zero learning rates. A first curve 501 illustrates an amount of processing, such as a number of processor cores assigned, for Alt_GD plotted against the learning rate. A second curve 502 illustrates an amount of processing, such as a number of processor cores assigned, for the gradient descent algorithm of the present disclosure plotted against the learning rate.

A first difference between curves 501 and 502 is that curve 501 begins at a non-zero learning rate, whereas curve 502 is capable of beginning at a lower learning rate. This means that Alt_GD makes larger changes the parameters at a beginning of operation than the gradient descent algorithm of the present disclosure makes. This creates the risk of moving too quickly toward a solution that is less than optimal.

A second difference between curves 501 and 502 is that curve 501 is that curve 501 begins at a low processing rate and ramps processing up over time, whereas curve 502 starts and remains at full processing capacity. This means that early iterations of Alt_GD operates on a machine learning structure that has received relatively less training data, whereas the early iterations of the gradient descent algorithm of the present disclosure operates on a machine learning structure that has received relatively more training data. As such, the gradient descent algorithm of the present disclosure converges towards the solution faster than Alt_GD.

To illustrate the improved processing of gradient descent algorithm of the present disclosure, FIG. 5 includes shaded areas comparing an amount of processing completed after four iterations of the respective gradient descent algorithms. For Alt_GD, at a time $T_1$ (at four iterations of Alt_GD, indicated by the fourth dot along curve 501), the total processing performed is shown as a shaded area under the curve 501. For the gradient descent algorithm of the present disclosure, at a time $T_1'$ (at four iterations of Alt_GD, indicated by the fourth dot along curve 502), the total processing performed is shown as a shaded area under the curve 502. As can be seen, the area of curve under 501 is significantly less than the area under curve 502. This demonstrates that overall processing is faster for curve 502. This also demonstrates that preliminary results, such as results available at times $T_1$ and $T_1'$, respectively, are more accurate for the gradient descent algorithm of the present disclosure than for Alt_GD. Stated another way, the gradient descent algorithm of the present disclosure allows for accurate preliminary results to be available sooner.

The above example routine 200 of FIG. 2 demonstrates a way of updating parameters using a Follow the Regularized Leader (FTRL) learning algorithm. Thus, the example routine 200 may be advantageous over alternative FTRL algorithms that involve dividing by the learning rate. It should be understood the same underlying principles may be applied to other algorithms, such as stochastic gradient descent algorithms, Adagrad, Adam, RMSProp, and so on. Stated another way, for other gradient descent algorithms that divide by a learning rate, the principles of the present disclosure, such as determining a product value and determining an updated parameter value based on the product value, may be applied to avoid having to divide by the learning rate.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for iteratively updating a parameter according to a gradient descent algorithm, the method comprising:
   in an $n^{th}$ iteration:
   determining, by one or more processors, a gradient value of a gradient vector of the parameter in a first dimension;
   determining, by the one or more processors, a product value based at least in part on a sum of (i) the product value determined in an $n-1^{th}$ iteration and (ii) a product of the determined gradient value and a learning rate of the gradient descent algorithm;
   determining, by the one or more processors, an updated parameter value according to a function including the product value; and
   updating, by the one or more processors, the parameter to equal the updated parameter value,
   wherein the product value equals a difference between (i) the product of an accumulated linear gradient value and the learning rate and (ii) the parameter value determined in the n−1$^{th}$ iteration scaled according to a scaling value, and wherein the method further comprises, determining, by the one or more processors, an accumulated square gradient value based on a square of the gradient value and the accumulated square gradient value of the n−1$^{th}$ iteration, wherein the scaling value is based on each of the accumulated square gradient value and the accumulated square gradient value of the n−1$^{th}$ iteration.

2. The method of claim 1, wherein the scaling value is equal to:

$$n_i^{-lr\_power} - n_{i-1}^{-lr\_power}$$

wherein $n_i$ is the accumulated square gradient value, $n_{i-1}$ is the accumulated square gradient value of the n−1$^{th}$ iteration, and lr_power is a predetermined parameter.

3. The method of claim 1, wherein the function including the product value determines the parameter value to equal:
   zero in response to a ratio between an absolute value of the product value and the learning rate exceeding a predetermined fixed value; and
   a non-zero value in response to the ratio between the absolute value of the product value and the learning rate being less than or equal to the predetermined fixed value.

4. The method of claim 3, further comprising determining the non-zero value according to a parameter function, wherein a denominator of the parameter function includes each of the accumulated square gradient value, a first predetermined fixed value, and a second predetermined fixed value, and wherein the parameter function returns a divide-by-zero error only when each of the accumulated square gradient value, the first predetermined fixed value, and the second predetermined fixed value equals zero.

5. The method of claim 3, wherein the parameter function is:

$$\frac{\lambda_1 \eta(sgn(p_i)) - p_i}{n_i^{-lr\_power} + \beta + 2\lambda_2 \eta}$$

wherein $\lambda_2$ and $\beta$ are the first and second predetermined fixed values, $\lambda_1$ is a third predetermined fixed value, $\eta$ is the learning rate, $p_i$ is the product value, and $n_i$ is the accumulated square gradient value.

6. The method of claim 1, wherein the learning rate is predefined to begin at zero and increase over time.

7. The method of claim 1, wherein the learning rate is predefined to begin close to zero and increase over time.

8. The method of claim 1, wherein the gradient vector of the parameter includes a plurality of dimensions, and wherein the method is performed independently for each respective dimension of the gradient vector.

9. The method of claim 1, wherein the parameter is a parameter of a neural network.

10. The method of claim 1, wherein the gradient descent algorithm is any one of a stochastic gradient descent algorithm, a Follow the Regularized Leader (FTRL) learning algorithm, Adagrad, Adam, or RMSProp.

11. The method of claim 1, wherein the learning rate is predefined to change over time, and wherein a number of cores included in the one or more processors assigned to perform the method remains constant as the learning rate changes over time.

12. A system comprising:
memory for storing instructions; and
one or more processors coupled to the memory and configured to execute the stored instructions to iteratively update a parameter according to a gradient descent algorithm, wherein, for an n$^{th}$ iteration of the gradient descent algorithm, the one or more processors are configured to:
   determine a gradient value of an gradient vector of the parameter in a first dimension;
   determine a product value based at least in part on a sum of (i) the product value determined in an n−1$^{th}$ iteration and (ii) a product of the determined gradient value and a learning rate of the gradient descent algorithm;
   determine an updated parameter value according to a function including the product value; and
update the parameter to equal the updated parameter value,
wherein the product value equals a difference between (i) the product of an accumulated linear gradient value and the learning rate and (ii) the parameter value determined in the n−1$^{th}$ iteration scaled according to a scaling value, and
wherein the one or more processors are configured to determine an accumulated square gradient value based on a square of the gradient value and the accumulated square gradient value of the n−1$^{th}$ iteration, wherein the scaling value is based on each of ale accumulated square gradient value and the accumulated gradient value of the n−1$^{th}$ iteration.

13. The system of claim 12, wherein the scaling value is equal to:

$$n_i^{-lr\_power} - n_{i-1}^{lr\_power}$$

wherein $n_i$ is the accumulated square gradient value, $n_{i-1}$ is the accumulated square gradient value of the n−1$^{th}$ iteration, and lr_power is a predetermined parameter.

14. The system of claim 12, wherein the function including the product value determines the parameter value to equal:
   zero in response to a ratio between an absolute value of the product value and the learning rate exceeding a predetermined fixed value; and
   a non-zero value in response to the ratio between the absolute value of the product value and the learning rate being less than or equal to the predetermined fixed value.

15. The system of claim 14, wherein the one or more processors are configured to determine the non-zero value according to a parameter function, wherein a denominator of the parameter function includes each of the accumulated square gradient value, a first predetermined fixed value, and a second predetermined fixed value, and wherein the parameter function returns a divide-by-zero error only when each of the accumulated square gradient value, the first predetermined fixed value, and the second predetermined fixed value equals zero.

16. The system of claim 14, wherein the parameter function is:

$$\frac{\lambda_1 \eta(sgn(p_i)) - p_i}{n_i^{-lr\_power} + \beta + 2\lambda_2 \eta}$$

wherein $\lambda_2$ and $\beta$ are the first and second predetermined fixed values, $\lambda_1$ is a third predetermined fixed value, $\eta$ is the learning rate, $p_i$ is the product value, and $n_i$ is the accumulated square gradient value.

17. The system of claim 12, wherein the learning rate is predefined to begin at zero and increase over time.

18. The system of claim 12, wherein the learning rate is predefined to begin close to zero and increase over time.

19. The system of claim 12, wherein the gradient vector of the parameter includes a plurality of dimensions, and wherein the one or more processors are configured to update a parameter of each respective dimension of the gradient vector independent of one another.

20. The system of claim 12, wherein the parameter is a parameter of a neural network.

21. The system of claim 12, wherein the gradient descent algorithm is any one of a stochastic gradient descent algorithm, a Follow the Regularized Leader (FTRL) learning algorithm, Adagrad, Adam, or RMSProp.

22. The system of claim 12, wherein the one or more processors includes a constant number of cores assigned to iteratively update the parameter according to the gradient descent algorithm.

\* \* \* \* \*